MANUFACTURE OF ELECTRICAL APPLIANCES
WITH PRINTED WIRING PANELS

Filed July 20, 1955

Inventors:
Sidney V. Worth
Stanton L. Yarbrough
by Howson & Howson
Attys.

United States Patent Office 2,923,859

Patented Feb. 2, 1960

2,923,859

MANUFACTURE OF ELECTRICAL APPLIANCES WITH PRINTED WIRING PANELS

Sidney V. Worth, Philadelphia, and Stanton L. Yarbrough, Glenside, Pa., assignors to Philco Corporation, Philadelphia, Pa., a corporation of Pennsylvania Application July 20, 1955, Serial No. 523,189

2 Claims. (Cl. 317—101)

The invention hereinafter described and claimed relates to electrical apparatus, being especially concerned with the making of electrical connections between circuit components and the relatively flat, ribbon-like conductors which characterize circuits of the so-called "printed" type.

It is necessary in such apparatus that the parts electrically connected to the printed pattern of the wiring panel include not only components which are secured directly against the rear side of the panel, but also other parts which are not mounted upon the panel and must therefore be interconnected with the panel printed wiring pattern terminals by wire conductors. This interconnecting of the panel with other parts has previously been accomplished by a procedure involving manual securement of the lengths of these wires at one end to the terminals of the printed pattern. This was a manual operation presenting a strange contrast to the quantity production methods by which the printed panels have been produced and electrically interconnected with the components mounted on their rear sides, but no one, so far as we are aware, has proposed a method by which these tedious wiring operations could be made a part of the high speed assembly operation.

This invention has had, as its primary object, the provision of a method by which conductor wires to be attached to other parts of the appliance might be secured in place in electrically connected relation to the printed wiring terminals by a mass production technique comparable in speed and effectiveness to that involved in securement of other components to the printed wiring panel. A further and more specific object and feature of the invention has been the treatment and securement of the conductor wires in such a manner that they could be affixed, secured in place by soldering, and assembled with the appliance of which they are to form a part, in the same series of operations by which the other components are affixed and secured, without any substantial time delay for separate securement of these conductor wires.

Figure 1:
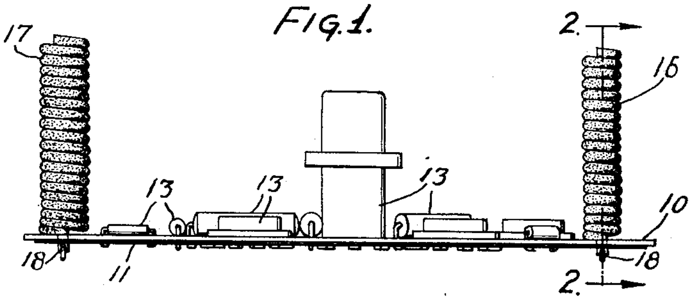
Figures 2, 3, 6, 7:
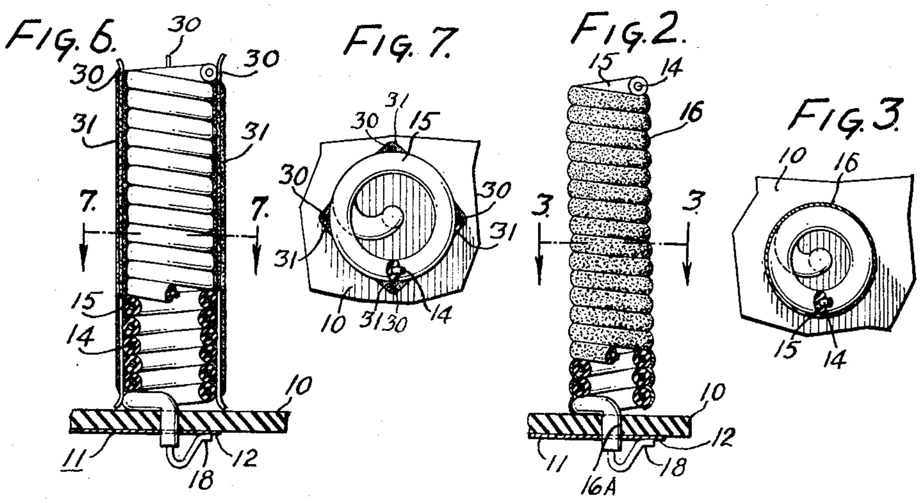
Figures 4, 5:
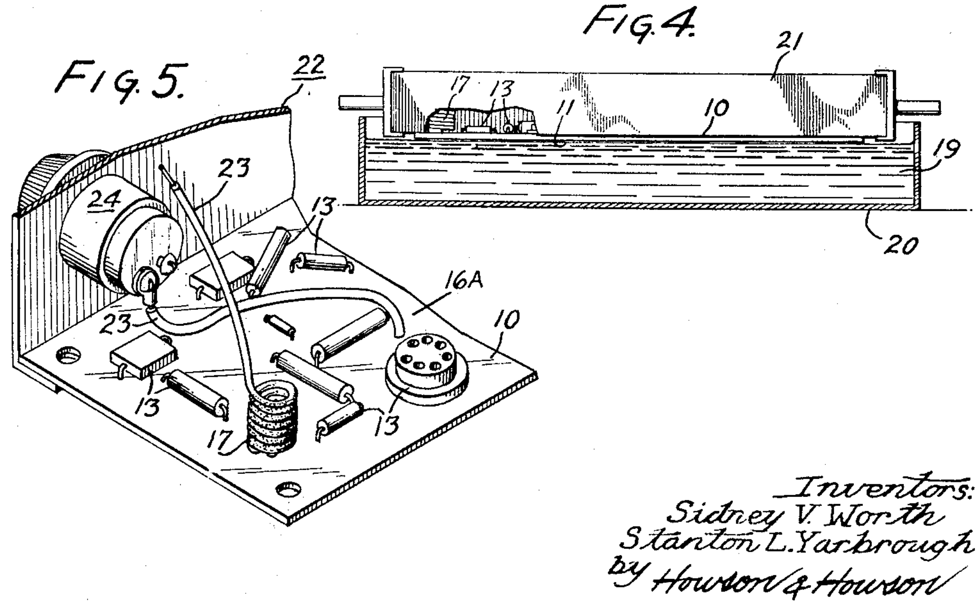

Still further objects and advantages of the invention, and the manner in which they have been attained, will be evident from reading of the following detailed description in the light of the attached drawings in which, Figure 1 is a side elevation of parts assembled in the practice of the invention, with the conductor wires and other components affixed in position for treatment in the simultaneous dip soldering operation, Figure 2 is a cross-section on the line 2—2 of Figure 1, Figure 3 is a cross-section on the line 3—3 of Figure 2, Figure 4 is a side elevation illustrating the dip soldering step as performed in the practice of the invention, Figure 5 is a perspective view illustrating the assembly and attachment of the completed panel and components in a radio set, Figure 6 is a view corresponding to Figure 2, illustrating a slight modification, and Figure 7 is a cross-section on the line 7—7 of Figure 6.

As illustrated in Figures 1 and 2, the panel comprises a board 10 which may be formed of suitable insulating material, such as a synthetic resin, and the printed wiring pattern, including thin, flat conductor strips 11 and terminals 12, may be applied to the face of the panel by any known method. Substantially each component 13 has at least two leads, as indicated in Figure 5, and has all of said leads affixed to the rear or opposite side of the panel by passing their wiring leads through holes in the panel and crimping them against the printed pattern terminal connections 12. It has heretofore been the practice in the art to dip such panels, with the components and terminal connections affixed as illustrated, into a soldering bath with the panel face contacting the upper surface of the molten solder, in order to solder the crimped leads in place. Thus, most of the components which are fixed to the panel and electrically connected with its wiring pattern are positioned and affixed by rapid production line methods, and are secured in place by soldering in a single operation. However, the wiring connections from the panel to more remote parts of the appliance have been performed manually in separate, subsequent, steps.

In the practice of this invention, the wiring conductors are treated in such a way that they may be handled and secured in the same manner as the other components, and these conductor wires are thereafter affixed and secured in just the same way as the other components. The individual conductor wires 14 with their surrounding insulating casings 15 are first formed into relatively compact shape as by coiling, and they are treated to render them relatively rigid in that shape. This treatment may involve dipping in a viscous liquid, or treatment with a liquid which, when it dries and sets, forms a stiff sheathing 16 to secure the wire temporarily in its coiled shape. An example of such a liquid is the product known in the trade as "Duco Cement."

After the individual conductor wires have been so treated, to produce compacted and rigid wiring units as indicated at 16 and 17, they may be handled and manipulated by the same type of automatic machinery by which the other components are assembled, affixed and secured in place. These compacted and rigidified wire conductors are accordingly applied as illustrated in Figures 1 and 2 to the rear face of the panel, with one of the terminal ends of each inserted through a hole 16A in the panel, and these terminal ends are thereafter crimped or clipped into place as illustrated at 18 in Figure 2 so that said terminal ends, like those of components 13 (Figure 1), extend over small distances laterally of the insertion holes, in contact with printed conductors 11. The entire panel, with these conductor wires and the other components affixed in this manner, is then dipped, face down, into the soldering bath in order to solder to the terminals of the printed pattern all of the conductor wire ends 18 and the lead wires of the other components, in a single operation. As illustrated in Figure 4 of the drawing, this may be accomplished by mounting the panel upon a suitable fixture 21, and dipping it face down against the upper surface of a body of molten solder 19 in a container 20.

After the soldering operation has been completed, the panel with attached components and compacted conductor wires is assembled with the other parts of the electrical appliance, such as the radio 22 partially illustrated in Figure 5, and the ends of the wires 14 are then grasped and extended as illustrated at 23 in Figure 5, and attached to the parts of the appliance removed from the panel with which they are to be interconnected. As illustrated in Figure 5, one of these wires 23, having one end anchored to the panel 16A, has been interconnected at the other end with the speaker control 24 of the radio set, and the other is in course of being uncoiled and interconnected with another part of the set.

In the form of the invention illustrated in Figures 6 and 7, instead of surrounding the entire coil of the wire conductor 14 with a sheathing 16, the securement of this coil in relatively rigid form in that shape is attained by applying longitudinally extending members 30 along opposite sides thereof, and applying the liquid rigidifying agent to form a coating 31 only at these four longitudinally extending locations along the length of the coiled wire. The longitudinally extending members may be strings, tapes or wires, and they may be readily peeled off to release the coil and allow it to be extended as illustrated in Figure 5, after the coil has been affixed and secured as a rigid body, as discussed in the description above pertaining to use of the form illustrated in Figures 1 to 5.

While the invention has been discussed above only in relation to two specific forms of the invention, persons skilled in the art will be aware that it may be refined and modified in various ways without departing from its scope. We therefore wish to have it understood that this invention is not to be limited in interpretation except by the terms of the following claims.

We claim:

1. As an article of manufacture for the fabrication of electrical apparatus, a circuit panel unit comprising: an electrically insulating board with insertion holes therein; flat conductors on one surface of the board, with terminal portions adjacent such holes; circuit component means on the opposite surface of said board, having leads extending through such insertion holes and into contact with such terminal portions; and elongate but compacted wire conductor means on said opposite surface of the board, having lead end portions similarly extending; solder means permanently connecting the component leads and the lead end portions of the wire conductor means with the respective terminal portions of the flat conductors; and means adapted to hold the wire conductor means compacted but allowing successive individual portions thereof to be extended for attachment to other circuitry.

2. Apparatus as described in claim 1 wherein the compacted wire conductor means is a coil coaxial with the corresponding insertion hole.

References Cited in the file of this patent

UNITED STATES PATENTS

| | | |
|---|---|---|
| 1,734,605 | Smith | Nov. 5, 1929 |
| 1,983,379 | Leach | Dec. 4, 1934 |
| 2,206,703 | Lowe | July 2, 1940 |
| 2,440,308 | Starck | Apr. 27, 1948 |
| 2,477,653 | Roane | Aug. 2, 1949 |
| 2,607,821 | Van Arsdell | Aug. 19, 1952 |
| 2,628,996 | Mayo | Feb. 17, 1953 |
| 2,749,382 | Lockard | June 5, 1956 |
| 2,756,485 | Abramson et al. | July 31, 1956 |